United States Patent
Sripathan et al.

(10) Patent No.: US 9,710,239 B2
(45) Date of Patent: Jul. 18, 2017

(54) SYSTEM AND METHOD FOR SOFTWARE APPLICATION LIFECYCLE MANAGEMENT

(71) Applicant: Wipro Limited, Bangalore (IN)

(72) Inventors: Jayashree Sripathan, Bangalore (IN);
Kavitha Sridhar, Bangalore (IN);
Uppada Janki Rao, Bangalore (IN);
Remil Paul Jose, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 14/741,519

(22) Filed: Jun. 17, 2015

(65) Prior Publication Data

US 2016/0253156 A1    Sep. 1, 2016

(30) Foreign Application Priority Data

Feb. 27, 2015   (IN) .............................. 952/CHE/2015

(51) Int. Cl.
*G06F 9/44*    (2006.01)

(52) U.S. Cl.
CPC . *G06F 8/35* (2013.01); *G06F 8/70* (2013.01)

(58) Field of Classification Search
None
See application file for complete search history.

(56) References Cited

U.S. PATENT DOCUMENTS

| | | | | |
|---|---|---|---|---|
| 2004/0073886 A1* | 4/2004 | Irani | ...................... | G06Q 10/06 717/101 |
| 2009/0327048 A1* | 12/2009 | Kisin | ..................... | G06Q 10/00 705/7.37 |
| 2010/0205192 A1* | 8/2010 | Quadracci | ......... | G06F 17/30398 707/758 |
| 2013/0219358 A1* | 8/2013 | Klinger | ..................... | G06F 8/74 717/120 |
| 2013/0268913 A1* | 10/2013 | Anderson | ................. | G06F 8/70 717/120 |
| 2013/0290239 A1* | 10/2013 | Vaquero | ................. | G06N 5/025 706/47 |
| 2013/0304439 A1* | 11/2013 | Van der Velden | .. | G06F 17/5009 703/6 |
| 2016/0055079 A1* | 2/2016 | Hanna | ................. | G06F 11/3684 717/135 |

* cited by examiner

*Primary Examiner* — Daxin Wu
(74) *Attorney, Agent, or Firm* — LeClairRyan, a Professional Corporation (57) ABSTRACT

This disclosure relates generally to software application lifecycle management, and more particularly to system and method for software application lifecycle management using predictive models based on past similar software application deliveries. In one embodiment, a method is provided for software application lifecycle management. The method comprises gathering software application related information from a user, accessing outcomes of past similar software application deliveries from at least one of a knowledge repository and a learning repository based on the software application related information, deriving a set of models based on the outcomes of past similar software application deliveries, and providing options to the user for selection based on the set of models.

18 Claims, 4 Drawing Sheets

SYSTEM AND METHOD FOR SOFTWARE APPLICATION LIFECYCLE MANAGEMENT

This application claims the benefit of Indian Patent Application No. 952/CHE/2015 filed Feb. 27, 2015, which is hereby incorporated by reference in its entirety.

TECHNICAL FIELD

This disclosure relates generally to software application lifecycle management, and more particularly to system and method for software application lifecycle management using predictive models based on past similar software application deliveries.

BACKGROUND

In current business environment, effective project management is a key factor in the success of many enterprises. Information Technology (IT) organizations typically strive to achieve effective project management by implementing a complete life cycle management solution such that each project in an IT organization is created and developed according to a comprehensive lifecycle process. A software application lifecycle management solution defines software lifecycle activities for the software application development. Software application lifecycle management solution enables the IT organizations to perform real-time monitoring and control of its projects, utilize current industry knowledge and best-practices in managing them, and provide synchronization of quality framework with the project deliveries.

However, current software lifecycle management tools are static, inefficient and limited in its application. They may not be able to provide a value proposition or intelligence to the project deliveries even though they are employed regularly and extensively on each project. The users continue to carry forward typical manual errors and inefficiencies from one project to another, thereby resulting in the use of the tool only for corrective deliveries. Various other separate and independent tools have to be employed for identifying and predicting solutions for project deliveries. In short, the current software lifecycle management tools may not be able to predict or effectively provide ready to use deliverables for a software project.

SUMMARY

In one embodiment, a method for software application lifecycle management is disclosed. In one example, the method comprises gathering software application related information from a user. The method further comprises accessing outcomes of past similar software application deliveries from at least one of a knowledge repository and a learning repository based on the software application related information. The method further comprises deriving a set of models based on the outcomes of past similar software application deliveries. The method further comprises providing options to the user for selection based on the set of models.

In one embodiment, a system for software application lifecycle management is disclosed. In one example, the system comprises a processor, a memory communicatively coupled to the processor, wherein the memory stores processor-executable instructions, which, on execution, cause the processor to gather software application related information from a user. The processor-executable instructions, on execution, further cause the processor to access outcomes of past similar software application deliveries from at least one of a knowledge repository and a learning repository based on the software application related information. The processor-executable instructions, on execution, further cause the processor to derive a set of models based on the outcomes of past similar software application deliveries. The processor-executable instructions, on execution, further cause the processor to provide options to the user for selection based on the set of models.

In one embodiment, a non-transitory computer-readable medium storing computer-executable instructions for software application lifecycle management is disclosed. In one example, the stored instructions, when executed by a processor, cause the processor to perform operations comprising gathering software application related information from a user. The operations further comprise accessing outcomes of past similar software application deliveries from at least one of a knowledge repository and a learning repository based on the software application related information. The operations further comprise deriving a set of models based on the outcomes of past similar software application deliveries. The operations further comprise providing options to the user for selection based on the set of models.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
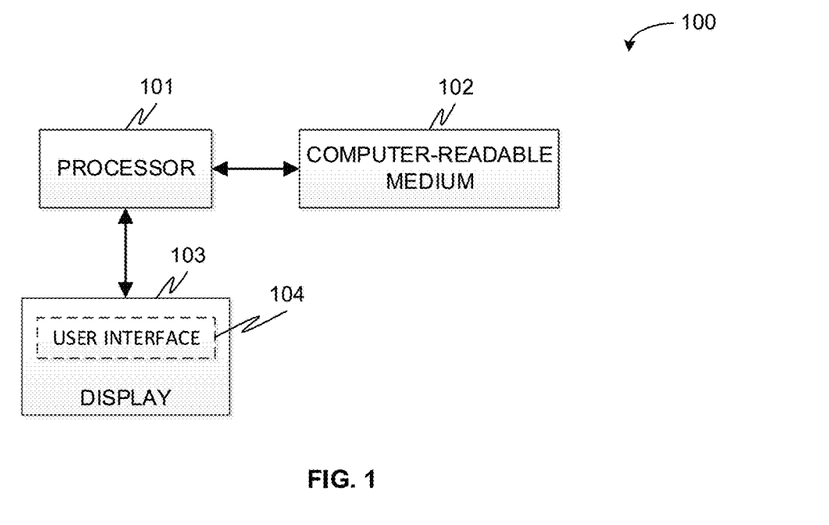
FIG. 1 is a block diagram of an exemplary system for software application lifecycle management in accordance with some embodiments of the present disclosure.

Referring now to FIG. 1, an exemplary system 100 or software application lifecycle management platform (SALMP) computing device for software application lifecycle management is illustrated in accordance with some embodiments of the present disclosure. In particular, the system 100 implements a SALMP that provides predictive models for software application lifecycle management based on the previous similar deliveries. The system 100 comprises one or more processors 101, a computer-readable medium (e.g., a memory) 102, and a display 103. The computer-readable medium 102 stores instructions that, when executed by the one or more processors 101, cause the one or more processors 101 to perform software application lifecycle management in accordance with aspects of the present disclosure. The system 100 interacts with users via a user interface 104 accessible to the users via the display device 103.

Figure 2:
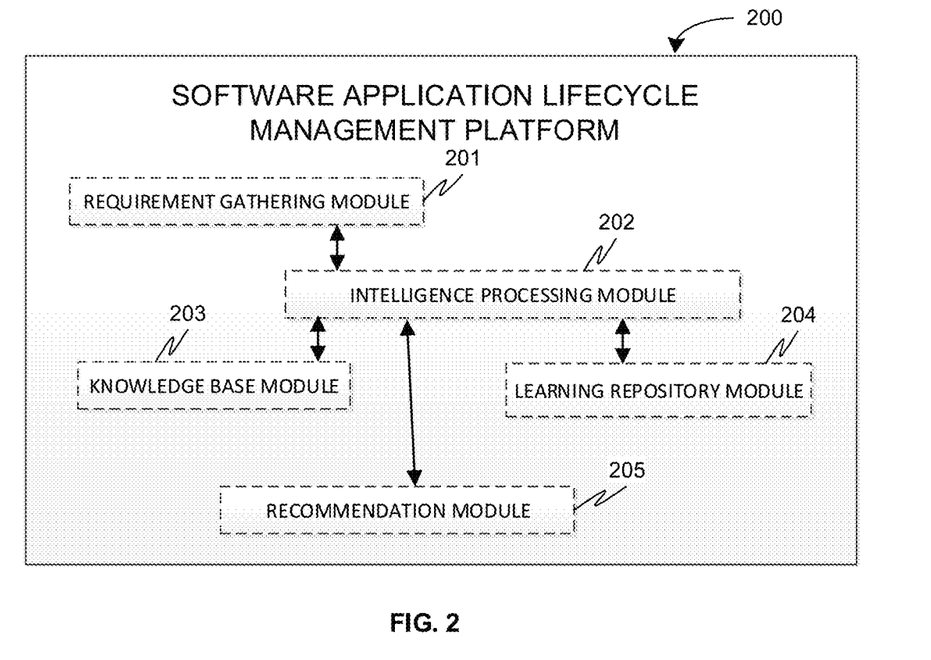
FIG. 2 is a functional block diagram of software application lifecycle management platform in accordance with some embodiments of the present disclosure.

Referring now to FIG. 2, a functional block diagram of the SALMP 200 implemented by the system 100 of FIG. 1 is illustrated in accordance with some embodiments of the present disclosure. In some embodiments, SALMP 200 comprises a requirement gathering module 201, an intelligence processing module 202, a knowledge base module 203, a learning repository module 204, and a recommendation module 205.

The requirement gathering module 201 gathers software application related information from a user. In some embodiments, requirement gathering module 201 prompts the user to inputs a set of keywords related to the software application via the user interface 104. Alternatively, in some embodiments, requirement gathering module 201 prompts the user to input a required outcome and a decision factor via the user interface 104. The requirement gathering module 201 then feeds the user input to the intelligence processing module 202 which in turn determines relevant keywords based on the required outcome and the decision factor. The relevant keywords are then populated via the requirement gathering module 201 on the user interface 104 for selection by the user. Further, in some embodiments, requirement gathering module 201 and the intelligence processing module 202 may display choice of various decision factors for user selection based on initial input of the required outcome.

It should be noted that the required outcome is the software application that needs to be developed or worked upon. For example, in one embodiment it may be an application development for mobile banking. Further, it should be noted that the decision factor is a combination of input and desired output factors, and comprises requirement to requirement modelling, requirement to tasks modelling, requirement to test cases modelling, test cases to test cases modelling, or requirement to end-to-end solution modelling.

The intelligence processing module 202 interacts with the requirement gathering module 201 to gather software application related information from the user as discussed above. The intelligence processing module 202 further accesses outcomes of past similar software application deliveries from the knowledge base module 203 or the learning repository module 204 based on the software application related information received from the requirement gathering module 201. In some embodiments, the intelligence processing module 202 builds a search query based on the software application related information (i.e., keywords entered or selected by the user) and searches the knowledge repository within the knowledge base module 203 or the learning repository within the learning repository module 204 for outcomes of past similar software application deliveries based on the search query. The intelligence processing module 202 further derives a set of models based on the outcomes of past similar software application deliveries. In some embodiments, intelligence processing module 202 derives a risk or a confidence level for each of the set of models. It should be noted that the set of models is in form of ready to use deliverables.

The intelligence processing module 202 provides options or recommendations to the user for subsequent selection based on the set of models via the recommendation module 205. In some embodiments, options comprise each of the set of models along with the corresponding risk and corresponding confidence level. For example, based on the decision factor (i.e., the desired output), the recommendation may be all the test cases that needs to be executed for given keywords for a particular requirement (requirement to test case modelling), or all the tasks that needs to be executed for the given keywords for a particular requirement (requirement to tasks modelling), or all the source code that may be impacted due to the requirement for given keywords.

The selection of one of the options by the user from multiple options generated triggers a new iteration or a new project on the SALMP. Further, the recommendation module 205 records the option selected by the user and conveys the same to the intelligence processing module 202 as feedback. The intelligence gathered from the user selection of the options is used by the intelligence processing module 202 to update the knowledge repository or the learning repository. In some embodiments, the intelligence processing module 202 updates the learning repository module by initiating learning of the learning repository module 204 based on the intelligence gathered. The SALMP therefore manages new data and data from past software application deliveries in the knowledge repository and the learning repository.

The knowledge base module 203 comprises the knowledge repository that includes data with respect to specific software application lifecycle from past. It has established linkage between keywords, requirements, test cases, test scripts, sub requirements and so forth. Similarly, the learning repository module 204 comprises the learning repository that includes data with respect to all software application lifecycle from past. The learning repository is a master database that stores data that is standard across software application development. The search query is first executed against the knowledge repository and only when there is no specific match it is executed against the learning repository. It should be noted that if the learning repository returns result then the knowledge repository is updated based on the result for the particular search query else a learning process is initiated to update the learning repository itself.

It should be noted that the SALMP may be implemented in programmable hardware devices such as programmable gate arrays, programmable array logic, programmable logic devices, and so forth. Alternatively, the SALMP may be implemented in software for execution by various types of processors. An identified engine of executable code may, for instance, comprise one or more physical or logical blocks of computer instructions which may, for instance, be organized as an object, procedure, function, module, or other construct. Nevertheless, the executables of an identified engine need not be physically located together, but may comprise disparate instructions stored in different locations which, when joined logically together, comprise the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for software lifecycle management. For example, the exemplary system 100 and the associated SALMP 200 may manage software application lifecycle by the processes discussed herein. In particular, as will be appreciated by those of ordinary skill in the art, control logic and/or automated routines for performing the techniques and steps described herein may be implemented by the system 100 and the associated SALMP 200, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 3A:
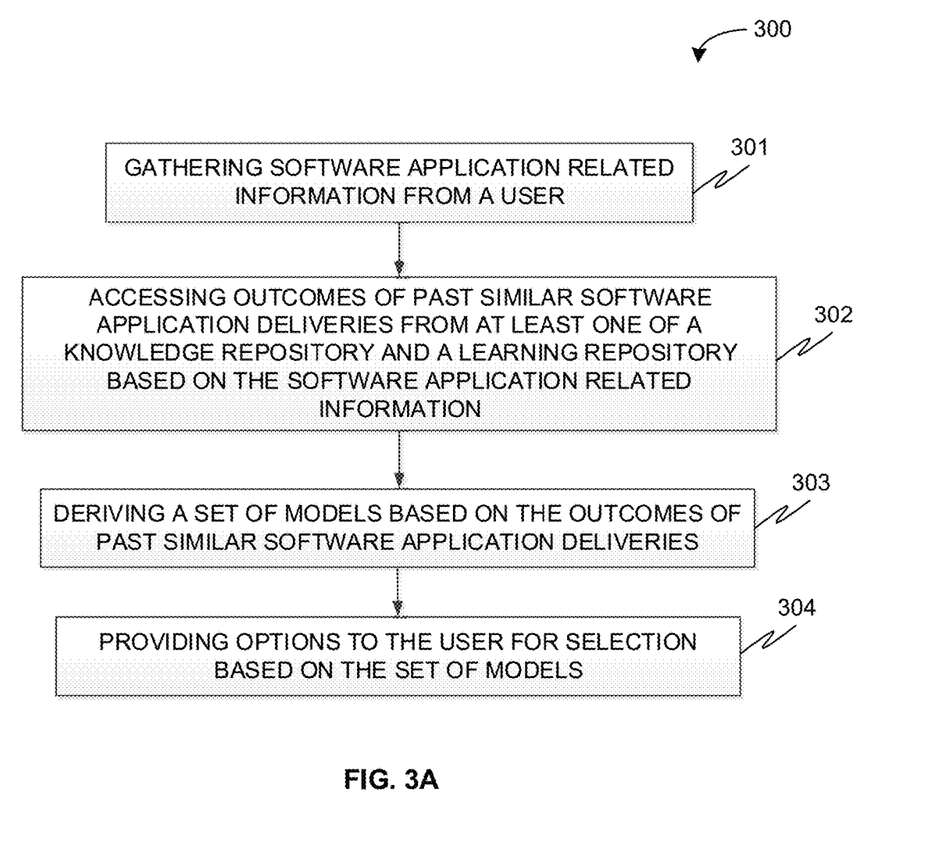
FIG. 3A is a flow diagram of an exemplary process for software application lifecycle management in accordance with some embodiments of the present disclosure.

For example, referring now to FIG. 3A, exemplary control logic 300 for software application lifecycle management via a system, such as system 100, is depicted via a flowchart in accordance with some embodiments of the present disclosure. As illustrated in the flowchart, the control logic 300 includes the steps of gathering software application related information from a user at step 301, accessing outcomes of past similar software application deliveries from at least one of a knowledge repository and a learning repository based on the software application related information at step 302, deriving a set of models based on the outcomes of past similar software application deliveries at step 303, and providing options to the user for selection based on the set of models at step 304.

Figure 3B:
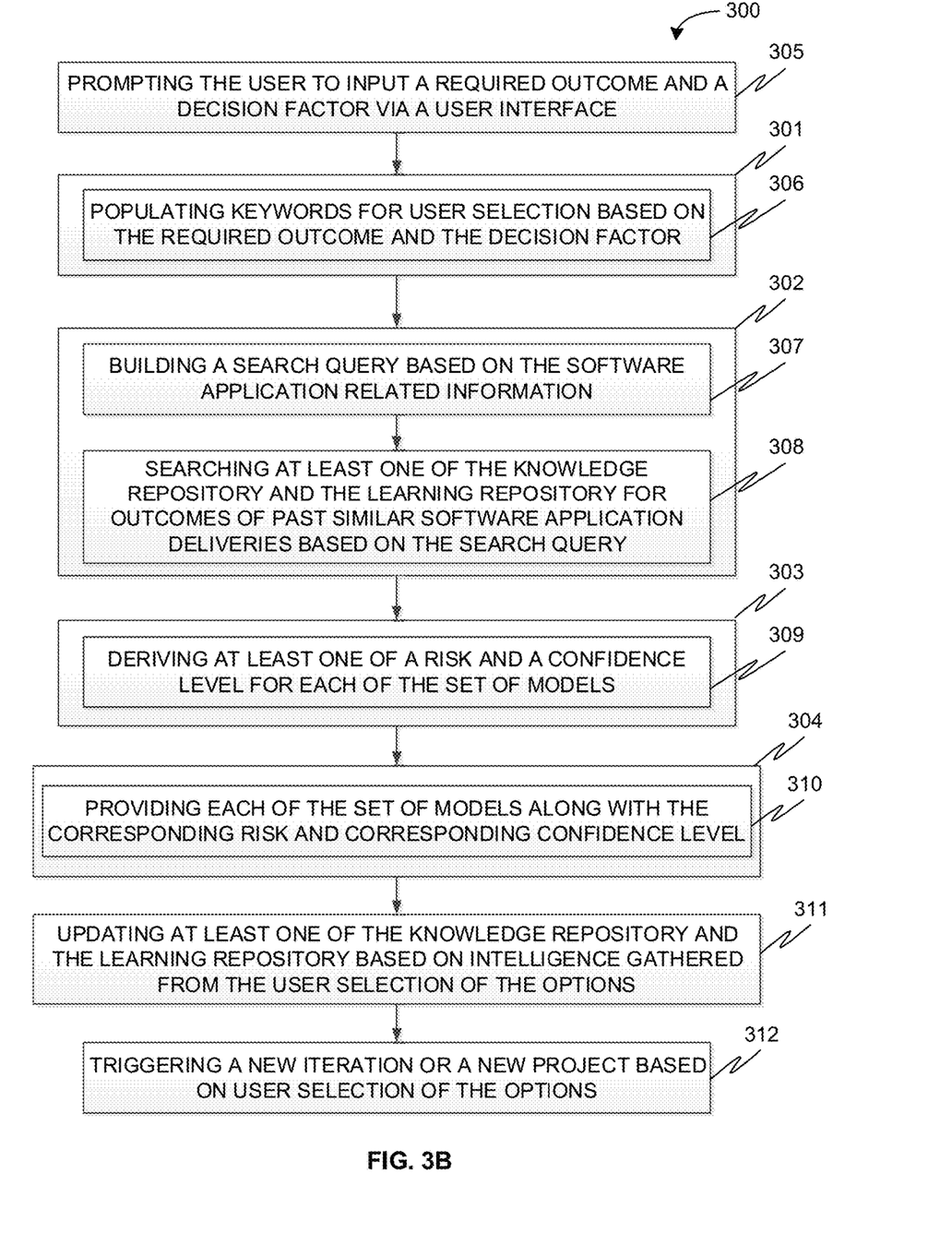
FIG. 3B is a flow diagram of a detailed exemplary process for software application lifecycle management in accordance with some embodiments of the present disclosure.

Referring now to FIG. 3B, the control logic 300 is depicted in greater detail via a flowchart in accordance with some embodiments of the present disclosure. The control logic 300 may further include the step of prompting the user to input a required outcome and a decision factor via a user interface at step 305. In some embodiments, gathering at step 301 comprises populating keywords for user selection based on the required outcome and the decision factor at step 306. Further, in some embodiments, accessing at step 302 comprises building a search query based on the software application related information at step 307 and searching at least one of the knowledge repository and the learning repository for outcomes of past similar software application deliveries based on the search query at step 308. In some embodiments, deriving at step 303 further comprises deriving at least one of a risk and a confidence level for each of the set of models at step 309 and providing options at step 304 comprises providing each of the set of models along with the corresponding risk and corresponding confidence level at step 310. The control logic 300 may further include the step of updating at least one of the knowledge repository and the learning repository based on intelligence gathered from the user selection of the options at step 311. It should be noted that the control logic 300 also comprises the step of managing new data and data from past software application deliveries in the knowledge repository and the learning repository. Finally, the control logic 300 comprises the step of triggering a new iteration or a new project based on user selection of the options at step 312.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 4:
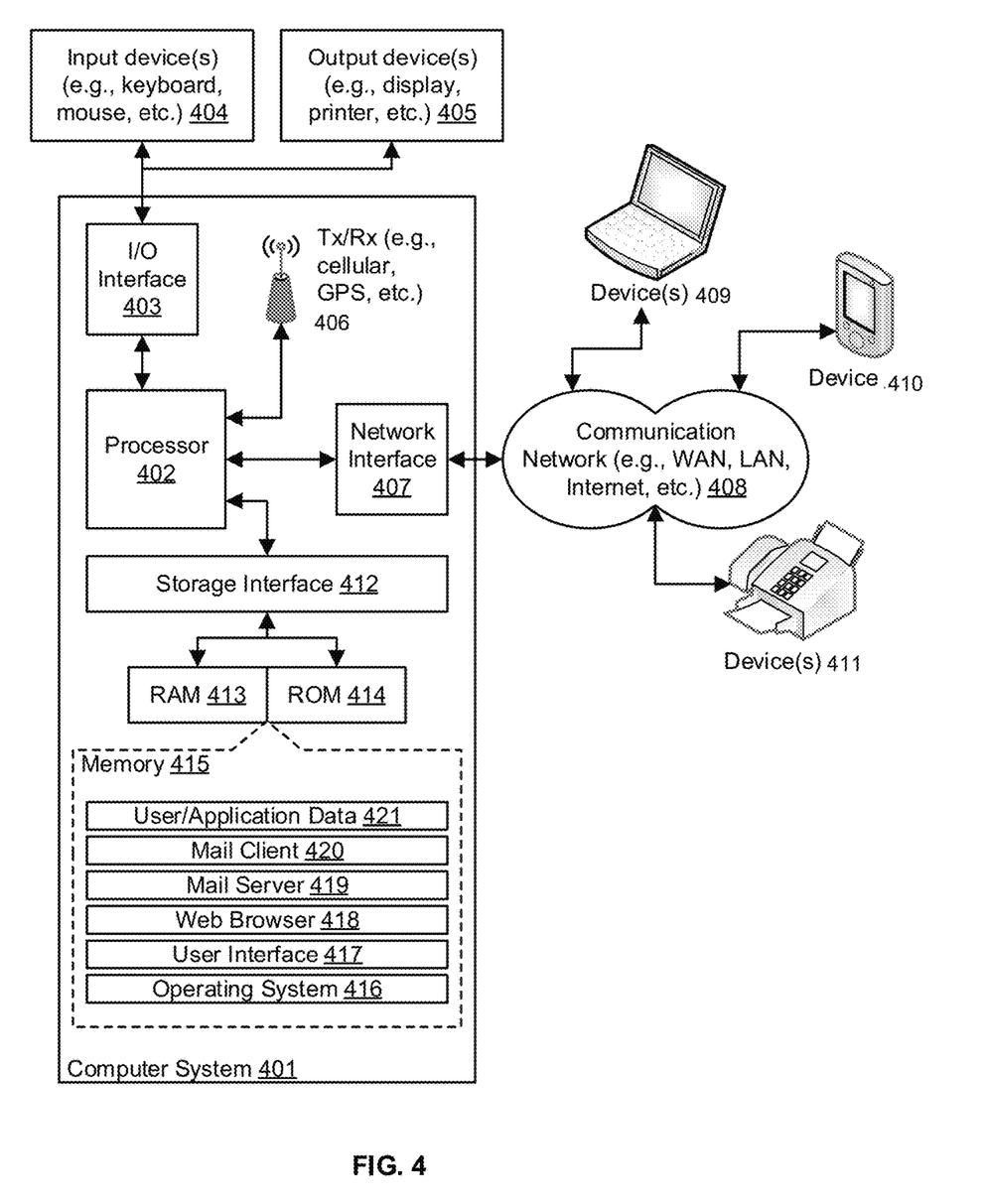
FIG. 4 is a block diagram of an exemplary computer system for implementing embodiments consistent with the present disclosure.

Referring now to FIG. 4, a block diagram of an exemplary computer system 401 for implementing embodiments consistent with the present disclosure is illustrated. Variations of computer system 401 may be used for implementing system 100 and SALMP 200 for software application lifecycle management. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. (e.g., keywords, requirements, test cases, test scripts, sub requirements, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above results in efficient and effective software application lifecycle management. Conventional software lifecycle management tools do not generate output or deliverables based on the knowledge gained from previous similar projects executed in the software lifecycle. The intelligent and integrated software application lifecycle management platform described in the embodiments discussed above provides predictive end to end models and ready to use deliverables for a software project based on previous similar deliveries, thereby resulting in significant reduction in cost and effort for similar project deliveries in similar domains. Additionally, the techniques described in the various embodiments discussed above provide recommendations based on reliable previous deliveries from within the application lifecycle management platform and the recommendations are in the form of ready to use deliverables.

Further, as will be appreciated by those skilled in the art, the software application lifecycle management platform described above provides for synchronization of quality framework with the application deliveries. Moreover, the intelligence driven software application lifecycle management platform provides for ready to use information for efforts estimates, work breakdown structure (WBS), and deliverables generated.

The specification has described system and method for software application lifecycle management. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for software application lifecycle management, the method comprising:
    obtaining, by a software application lifecycle management platform computing device, software application related data and one or more outcomes of prior corresponding software application deliveries from at least one of a knowledge repository or a learning repository based on the software application related data;
    generating, by the software application lifecycle management platform computing device, a set of models based on the outcomes of the prior corresponding software application deliveries, wherein the generating further comprises deriving a confidence level for each of the set of models, generating a search query based on the software application related data, and searching the knowledge repository for the outcomes of the prior corresponding software application deliveries based on the search query, wherein the searching is executed against the learning repository when there is no match in the knowledge repository; and
    outputting, by the software application lifecycle management platform computing device, one or more options for selection based on the set of models along with the corresponding confidence level.

2. The method of claim 1, further comprising prompting, by the software application lifecycle management platform computing device, a user to input a required outcome and a decision factor via a provided user interface, wherein the decision factor comprises a combination of input and desired output factors and requirement-to-requirement modeling, requirement-to-tasks modeling, requirement-to-test cases modeling, test cases-to-test cases modeling, or requirement-to-end-to-end solution modeling.

3. The method of claim 2, wherein the obtaining further comprises populating one or more keywords for selection based on the required outcome and the decision factor.

4. The method of claim 1, wherein the generating further comprises deriving a risk for each of the set of models, the outputting further comprises providing each of the set of models along with the corresponding risk, and each of the set of models is in a ready-to-use deliverable format.

5. The method of claim 1, further comprising triggering, by the software application lifecycle management platform computing device, a new iteration or a new project in response to a selection of one or more of the options.

6. The method of claim 1, further comprising updating, by the software application lifecycle management platform computing device, at least one of the knowledge repository or the learning repository based on intelligence generated from a selection of one or more of the options.

7. A software application lifecycle management platform computing device, comprising at least one processor and a memory coupled to the processor which is configured to execute programmed instructions comprising and stored in the memory to:
    obtain software application related data and one or more outcomes of prior corresponding software application deliveries from at least one of a knowledge repository or a learning repository based on the software application related data;
    generate a set of models based on the outcomes of the prior corresponding software application deliveries wherein the generating further comprises deriving a confidence level for each of the set of models, generating a search query based on the software application related data, and searching the knowledge repository for the outcomes of the prior corresponding software application deliveries based on the search query, wherein the searching is executed against the learning repository when there is no match in the knowledge repository; and
    output one or more options for selection based on the set of models along with the corresponding confidence level.

8. The software application lifecycle management platform computing device of claim 7, wherein the processor coupled to the memory is further configured to execute at least one additional programmed instruction to prompt a user to input a required outcome and a decision factor via a provided user interface, wherein the decision factor comprises a combination of input and desired output factors and requirement-to-requirement modeling, requirement-to-tasks modeling, requirement-to-test cases modeling, test cases-to-test cases modeling, or requirement-to-end-to-end solution modeling.

9. The software application lifecycle management platform computing device of claim 8, wherein the processor coupled to the memory is further configured to execute at least one additional programmed instruction to populate one or more keywords for selection based on the required outcome and the decision factor.

10. The software application lifecycle management platform computing device of claim 7, wherein the processor coupled to the memory is further configured to execute at least one additional programmed instruction to derive a risk for each of the set of models, the outputting further comprises providing each of the set of models along with the corresponding risk, and each of the set of models is in a ready-to-use deliverable format.

11. The software application lifecycle management platform computing device of claim 7, wherein the processor coupled to the memory is further configured to execute at least one additional programmed instruction to trigger a new iteration or a new project in response to a selection of one or more of the options.

12. The software application lifecycle management platform computing device of claim 7, wherein the processor coupled to the memory is further configured to execute at least one additional programmed instruction to update at least one of the knowledge repository or the learning repository based on intelligence generated from a selection of one or more of the options.

13. A non-transitory computer readable medium having stored thereon instructions comprising executable code which when executed by a processor, causes the processor to perform steps comprising:
   obtaining software application related data and one or more outcomes of prior corresponding software application deliveries from at least one of a knowledge repository or a learning repository based on the software application related data;
   generating a set of models based on the outcomes of the prior corresponding software application deliveries wherein the generating further comprises deriving a confidence level for each of the set of models, generating a search query based on the software application related data, and searching the knowledge repository for the outcomes of the prior corresponding software application deliveries based on the search query, wherein the searching is executed against the learning repository when there is no match in the knowledge repository; and outputting one or more options for selection based on the set of models along with the corresponding confidence level.

14. The non-transitory computer readable medium of claim 13, further having stored thereon at least one additional instruction comprising executable code which when executed by the processor, causes the processor to perform at least one additional step comprising prompting a user to input a required outcome and a decision factor via a provided user interface, wherein the decision factor comprises a combination of input and desired output factors and requirement-to-requirement modeling, requirement-to-tasks modeling, requirement-to-test cases modeling, test cases-to-test cases modeling, or requirement-to-end-to-end solution modeling.

15. The non-transitory computer readable medium of claim 14, wherein the obtaining further comprises populating one or more keywords for selection based on the required outcome and the decision factor.

16. The non-transitory computer readable medium of claim 13, wherein the generating further comprises deriving a risk for each of the set of models, the outputting further comprises providing each of the set of models along with the corresponding risk, and each of the set of models is in a ready-to-use deliverable format.

17. The non-transitory computer readable medium of claim 13, further having stored thereon at least one additional instruction comprising executable code which when executed by the processor, causes the processor to perform at least one additional step comprising triggering a new iteration or a new project in response to a selection of one or more of the options.

18. The non-transitory computer readable medium of claim 13, further having stored thereon at least one additional instruction comprising executable code which when executed by the processor, causes the processor to perform at least one additional step comprising updating at least one of the knowledge repository or the learning repository based on intelligence generated from a selection of one or more of the options.

* * * * *